United States Patent
Dammann

(10) Patent No.: US 6,960,019 B2
(45) Date of Patent: *Nov. 1, 2005

(54) FIBER OPTIC TEMPERATURE MONITORING METHOD

(75) Inventor: Hans-Joachim Dammann, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/706,935

(22) Filed: Nov. 14, 2003

(65) Prior Publication Data

US 2004/0140421 A1 Jul. 22, 2004

Related U.S. Application Data

(63) Continuation of application No. 10/096,158, filed on Mar. 11, 2002, now Pat. No. 6,881,948.

(30) Foreign Application Priority Data

Mar. 10, 2001 (DE) .......................... 101 11 640

(51) Int. Cl.⁷ ............................. G01K 11/00; G01J 5/08
(52) U.S. Cl. ....................... 374/161; 374/107; 374/110; 374/119; 374/137; 385/12; 250/227.14; 702/130; 340/588
(58) Field of Search ................................. 374/161, 119, 374/107, 110, 136, 137, 4; 385/12; 250/227.14; 340/588–591; 703/6, 130

(56) References Cited

U.S. PATENT DOCUMENTS 4,655,607 A    4/1987 Kern et al. .................... 374/4
4,673,299 A  *  6/1987 Dakin .......................... 374/161
4,730,101 A  *  3/1988 Mahon et al. ............... 340/589
4,767,219 A  *  8/1988 Bibby .......................... 374/161
5,028,146 A  *  7/1991 Wada .......................... 374/161
5,102,232 A  *  4/1992 Tanabe et al. ............... 374/161
5,178,465 A  *  1/1993 Amano et al. ............... 374/161
5,251,274 A  * 10/1993 Carlstrom et al. ............ 385/13
5,272,334 A  * 12/1993 Sai .............................. 374/161
5,302,025 A  *  4/1994 Kleinerman ................ 374/161
5,306,088 A  *  4/1994 Zoerner ........................ 385/12
5,356,220 A  * 10/1994 Iida et al. .................... 374/161
5,419,636 A  *  5/1995 Weiss .......................... 374/161
5,467,942 A    11/1995 Abbas et al. ............. 244/75 R
5,469,265 A  * 11/1995 Measures et al. ...... 250/227.18
5,765,948 A  *  6/1998 Sai .............................. 374/161
5,821,861 A    10/1998 Hartog et al. ............... 340/584
5,825,804 A  * 10/1998 Sai .............................. 374/161
6,380,534 B1 *  4/2002 Farhadiroushan et al. ...................... 250/227.14
6,511,222 B1 *  1/2003 Bouamra .................... 374/161
6,547,435 B1 *  4/2003 Grosswig et al. ........... 374/137
6,881,948 B2 *  4/2005 Dammann ............. 250/227.14
2002/0125414 A1   9/2002 Dammann ............. 250/227.14

FOREIGN PATENT DOCUMENTS

EP           0421967 A1    4/1991

* cited by examiner

*Primary Examiner*—Gail Verbitsky
*Assistant Examiner*—Stanley J. Pruchnic, Jr.
(74) *Attorney, Agent, or Firm*—Oblon, Spivak, McClelland, Maier & Neustadt, P.C.

(57) ABSTRACT

A method of monitoring a temperature condition includes inputting a light pulse into a fiber optic cable and receiving a reflection signal that arises from said input light pulse in said fiber optic cable. A temperature condition along the fiber optic cable and a location of the temperature condition along the fiber optic cable is determined based on said reflection signal.

25 Claims, 1 Drawing Sheet

FIBER OPTIC TEMPERATURE MONITORING METHOD

CROSS REFERENCE TO RELATED APPLICATIONS

This application claims priority to and is a continuation of U.S. patent application Ser. No. 10/096,158 filed Mar. 11, 2002, now U.S. Pat. No. 6,881,948, which claims priority to German Application No. DE 10111640.3 filed Mar. 10, 2001. The entire content of each of these applications is incorporated herein by reference.

BACKGROUND OF THE INVENTION

1. Field of the Invention

The invention relates to a method for detecting and signaling the existence of overheating conditions and fires in an aircraft, and especially for detecting and identifying the location of an unacceptable temperature increase in a space, in a pipe or conduit, on a device, or in a pressurized or compressed air system, for example the bleed air system of which the pipes or conduits are connected to the aircraft engines for tapping hot pressurized bleed air therefrom. The temperature increase or unacceptable elevated temperature condition and its spatial location are detected by means of a sensor and the corresponding sensor signal is provided to an evaluating unit for evaluation and preferably for the generation of an alarm process and/or system switching or activation processes.

2. Discussion of the Background

Modern aircraft typically include a pressurized air system that delivers hot pressurized engine bleed air for various uses within the aircraft, for example for carrying out the pressurization and air conditioning of the aircraft cabin. This hot bleed air, which reaches temperatures up to 200° C., is conveyed from the aircraft engines to the end user devices, such as air conditioning packs, in a pipe or conduit system. In the event of a rupture or leak of this pipe system, the hot pressurized air flows out of the pipe system and can damage other components or systems of the aircraft arranged near the location of the pipe rupture or leak.

In order to avoid such a dangerous problem, aircraft have typically included a monitoring system that uses sensors to detect and recognize a faulty escape of hot air from the pipe system, and uses a computer to generate warnings and/or to switch off the pressurized air supply. In order to reduce the amount of time necessary for searching for a rupture or air leak during maintenance and repair work on the rather extensive pipe system, the known monitoring systems also determine and indicate the general area or locality of the leak or overheating condition.

The sensors of the conventional overheating monitoring systems are each embodied in the form of a coaxial conductor arrangement having a respective electrical plug on each of its two ends.

More particularly, the sensor includes an outer conductor embodied as a thin pipe or tube, an inner conductor embodied as a wire or the like running along in the center of the outer conductor pipe or tube, and a special salt compound pressed or enclosed in the annular space between the two conductors. At normal acceptable surrounding ambient temperatures, this salt compound acts as an electrical insulator. On the other hand, when the salt compound is heated above a prescribed temperature, the salt compound becomes electrically conductive and thus forms a low-resistance electrical path or connection between the inner and outer conductors at this overheated location. The so-called trigger temperature at which the salt compound becomes electrically conductive can be adjusted or preselected based on the composition or mixture proportions of the salt compound. Each one of these sensors is laid out along the pipeline that is to be monitored, and then connected by its electrical plugs to a computer, which evaluates the electrical data provided by the respective sensor.

In the conventional system, the computer measures the resistance between the outer conductor and the inner conductor of a respective sensor at regular time intervals. In the event a sensor, or a portion of a sensor at a particular location, overheats as a result of an unacceptable temperature increase in the area surrounding this location, the salt compound in the sensor at this location becomes electrically conductive and forms a low resistance electrical path between the inner and outer conductors at this location. As a result, the computer recognizes the low resistance of the sensor as an overheating condition and can then responsively generate an alarm indication or a switching or control signal for switching off the affected system. Furthermore, the computer can determine the location of the overheating condition by determining the resistance ratio of the inner conductor from the overheating location respectively to the two ends of the sensor.

The above described conventional system suffers at least the following disadvantages. The sensors require a rather complicated and costly manufacturing process, and also require a defined selection and setting of the desired trigger temperature during the manufacturing process. Once a sensor is manufactured, its trigger temperature is fixed. The tolerance range for the so-called trigger point or trigger temperature is relatively large, which diminishes the precision of the operation of the sensor. Since the sensors are designed and manufactured for a fixed temperature range, which is especially a rather narrow range, it becomes necessary to completely remove and exchange the sensors with different sensors if an effective temperature range of the monitoring system is to be changed. The ability to localize the area of the overheating condition using the conventional sensors in the conventional system is relatively inexact. Furthermore, the measurement signal given off by the sensor and received and evaluated by the computer must be shielded, because it is sensitive to electromagnetic interferences

SUMMARY OF THE INVENTION

In view of the above, it is an object of the invention to provide a method of the above mentioned general type, which utilizes sensors that are relatively easy to manufacture and that provide a relatively exact measurement, for carrying out an overheating and fire monitoring in an aircraft, especially in a manner that is not subject to interference and is carried out in a continuous, seamless, or gap-free manner. The invention further aims to avoid or overcome the disadvantages of the prior art, and to achieve additional advantages, as apparent from the present specification.

The above objects have been achieved in a system and a method according to the invention having the following characterizing features. A sensor comprising an optical fiber or a fiber optic cable is arranged in direct proximity to a monitored area, e.g. along an object that is to be monitored for overheating or fire conditions, and at least one end of the sensor is connected through an interface to a laser emitter and an optical receiver, which in turn are connected to a computer. The laser source or emitter that is controlled by the computer intermittently emits short duration laser light pulses into the fiber optic cable of the sensor, and the reflection signals arising in the fiber optic cable from the reflections of the light pulses are received by the optical receiver, which preferably converts the received optical signal into a corresponding electrical signal that is transmitted to the computer. As a result, the received signals are compared, in the computer, with a prescribed threshold or a prescribed comparison signal having a reflection transit or return time that is dependent on the length of the respective fiber optic cable of the sensor.

In the event that an unacceptable temperature increase arises in or around the object to be monitored; the fiber optic cable of the sensor undergoes a temperature induced change of its refractive characteristics, and as a result generates an additional reflection pulse arising at the location of the overheating of the fiber optic cable. Thus, the reflection signal received by the optical receiver will include this additional reflection, pulse, which is not included in, or deviates from, the comparison signal that is stored in or provided to the computer for comparison with the actually received reflection signal. Based on the amplitude of the additional reflection pulse, the temperature level of the unacceptable temperature increase of the object is determined by the computer. Moreover, based on the reflection transit or return time of the additional reflection pulse, the computer determines the location of the unacceptable temperature increase of the object.

If the temperature level exceeds the acceptable temperature threshold, the computer triggers, generates, or releases a signal that can be further used to provide an alarm indication to the crew of the aircraft, or to activate safety measures or corrective measures such as activating a fire suppression system, or shutting down at least the affected area or component of the system being monitored.

The invention makes advantageous use of the Rayleigh effect, whereby a temperature increase will cause the optical fiber or the fiber optic cable to exhibit a different refraction characteristic at the affected location. Also, the Fresnel effect, by which a reflection pulse will be generated, is further advantageously used. Thus, in connection with the Rayleigh effect the invention can measure a temperature increase that arises at a certain location along the fiber optic cable, and in connection with the Fresnel effect, the invention can precisely determine the location of this temperature increase relative to the total length of the fiber optic cable. Alternatively, the location of the overheating condition can be determined with respect to an absolute distance of the location from one end of the cable.

With the above discussed measurement results or data, the monitoring arrangement, particularly including a computer, can advantageously carry out at least the following tasks in connection with the monitoring for overheating and fire conditions. The computer evaluates the measurement results in consideration of comparison signals or thresholds that are prescribable and adjustable, for example preferably by means of software changes.

The present inventive method can determine the occurrence of temperatures exceeding preset temperature limits along the length of the sensor, whereby different temperature limits may be specified for different portions or zones of the length of the sensor. This can be achieved by making appropriate selections or adjustments, preferably simply by software changes, of the comparison signals or thresholds to be used for evaluating the measurement data for each respective associated zone of the sensor. Namely, different temperature thresholds or limit values can be allocated respectively to different ranges of the reflection signal transit time, which in turn are respectively allocated to respective zones of the sensor.

The inventive method further can determine the duration of an overheating condition at any respective location, and can determine the temperature progression over prescribed time intervals at each respective location, by simply repeating successive cycles of the monitoring process. This enables better diagnosis of problems, and allows temporary, short-duration and thus non-critical overheating conditions to be indicated or the like, without triggering a drastic corrective measure such as shutting down the affected system or component.

Furthermore, any faulty interruption of the fiber optic cable can be detected, due to the change of the end reflection signal. The portion of the fiber optic cable between the location of the break and the interface at which the cable is connected to the computer remains fully functional and may continue to be used for carrying out the usual monitoring functions.

The inventive method may also provide an indication or display of the results determined by the computer, and/or may automatically trigger or actuate any necessary changes or manipulations of the system being monitored, for example switching off the system being monitored, or the affected portion or portions of the monitoring system, when prescribed temperature values are exceeded.

BRIEF DESCRIPTION OF THE DRAWINGS

In order that the invention may be clearly understood, it will now be described in connection with example embodiments, with reference to the accompanying drawings, wherein.

DESCRIPTION OF THE PREFERRED EMBODIMENTS

Figure 1:
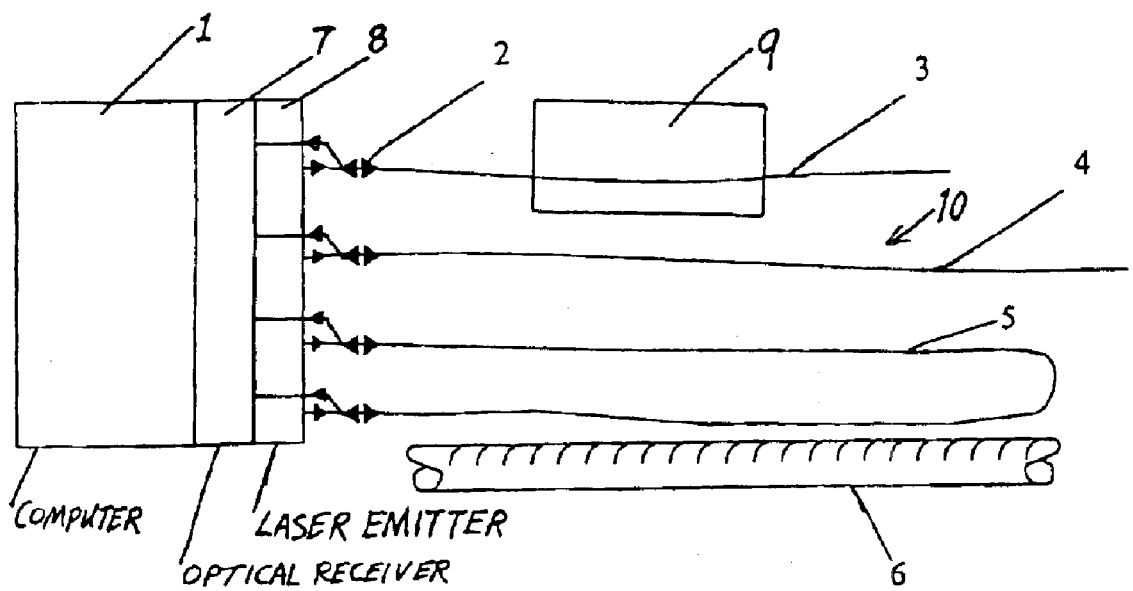
FIG. 1 is a schematic diagram of the basic components of a system for monitoring temperature conditions to detect overheating of a device, a pipe, or a space.

FIG. 1 schematically shows a general overview of a monitoring arrangement and sensors connected thereto for monitoring the temperature of a monitored area so as to detect an overheating or fire condition in the monitored area. The general term "overheating condition" includes a fire condition. The monitoring arrangement includes a computer 1 connected to an optical receiver and a laser source or emitter 8. The sensors include three representative sensors 3, 4 and 5 that are each connected via an interface 2 to the optical receiver 7 and the laser emitter 8, such that the laser emitter 8 can selectively feed a laser pulse through the respective interface 2 into the respective sensor 3, 4 and 5, and so that the optical receiver 7 can receive return or reflection pulse from the respective sensor 3, 4 or through the associated interface 2. The laser emitter 8 is connected to the computer 1 to be controlled and selectively actuated by the computer 1. The optical receiver 7 is connected to the computer 1 so as to convert the received optical reflection signals into corresponding electrical signals that it provides to the computer 1.

Each one of the sensors 3, 4 and 5 respectively comprises an optical fiber or fiber optic cable. The simplest embodiment of the fiber optic cable is understood to cover simply a single optical fiber, but may further refer to an optical fiber covered by a sheath, a bundle of optical fibers covered by a sheath, or even a bundle of individually sheathed fibers. The term "fiber optic cable" will be used generally herein to refer to any one of such arrangements. The optical fiber or fibers in a fiber optic cable may each be a glass fiber or an optical fiber of any other known material that is suitable for conducting a light signal therealong. The particular material may be selected according to the invention to provide the desired refractive characteristics in the required temperature range. The characteristics of a compound fiber including an inner core and a cladding layer, as well as the characteristics of the sheath, must also be taken into consideration.

The respective fiber optic cable of the two sensors 3 and 4 is connected at only one of its ends through an interface 2 to the monitoring arrangement, i.e. the optical receiver 7 and the laser emitter 8, and thereby also to the computer 1. On the other hand, the fiber optic cable of the sensor 5 is laid out as a loop, whereby both of its ends are connected through respective interfaces 2 to the optical receiver 7 and the laser emitter 8. The sensors 3, 4, and 5 are laid out in the aircraft so as to monitor the desired monitored area, respectively. For example, the sensor 3 is laid out along a device 9 that is to be monitored for its temperature conditions, i.e. for overheating or fire conditions. Such a device may, for example, be any electrical or electronic device, a turbo machine, a fuel tank, or any other device in an aircraft in which the temperature is to be monitored. The sensor 4 is arranged to extend through a space 10 that is to be monitored, which may, for example, be a cargo or baggage hold space, a confined space within a wing, or other spaces within the aircraft of which the temperature is to be monitored. The looped sensor 5 is arranged to extend along a pipe or conduit 6, which is, for example, a component of the hot pressurized bleed air system in the aircraft.

In order to detect any unacceptable temperature increase in any one of the monitored areas, i.e. the monitored device 9, the monitored space 10, or the monitored pipe or conduit 6, the invention makes use of the Rayleigh effect. Namely, the temperature-dependent Rayleigh scattering of a light pulse traveling along the respective fiber optic cable of the respective sensor 3, 4, or 5 will cause a corresponding characteristic temperature-dependent return or reflection pulse that can be detected by the optical receiver 7. In this case, the temperature dependence of the refractive characteristics of the fiber optic cable is used for being able to identify the temperature to which any given location along the fiber optic cable of the respective sensor 3, 4, or 5 is being subjected.

Moreover, through the use of the Fresnel effect, the length of the fiber optic cables of the sensors 3, 4 and 5 can be determined. Namely, the Fresnel reflection at the free end of the fiber optic cable, of an input light pulse traveling along the fiber optic cable of the respective sensor 3, 4, or 5, will return to the monitoring arrangement with a reflection transit or return time, which is the time between the introduction of the input light pulse into the fiber optic cable and the reception of the reflection pulse, respectively at the end of the fiber optic cable connected to the interface. Since this reflection transit time is directly dependent on the length of the fiber optic cable (in consideration of the speed of light traveling in the medium of the fiber optic cable), it can thus be used for the computational determination of the length of the respective sensor.

The above signal evaluations are carried out as follows. The computer 1 selectively actuates the laser emitter 8 so as to emit and feed a light pulse into the respective fiber optic cable of the respective sensor, e.g. sensor 3. The optical receiver 7 then receives the optical signal that is reflected from the fiber optic cable of the sensor 3 back through the interface 2 to the optical receiver 7, and converts this received optical reflection signal into a corresponding electrical signal that is provided to the computer 1 for evaluation. A main internal reflection will arise in the fiber optic cable, and an additional Fresnel reflection will arise from the free end of the fiber optic cable of the sensor 3, as mentioned above.

The computer 1 measures the respective reflection transit times. The computer uses the reflection transit or return time of the additional Fresnel reflection to calculate the length of the respective sensor 3, i.e. of the fiber optic cable. In this manner, if the fiber optic cable of the sensor 3 is damaged or broken, this will be immediately detected by the corresponding change of the apparent length of the fiber optic cable as determined from the reflection transit time of the additional Fresnel reflection. The location of the break or damage, which causes a significant change of the refractive characteristics of the fiber optic cable at this location, can thus also be determined from the new calculation of the apparent remaining length of the fiber optic cable.

In each case, the optical reflection signal is received by the optical receiver 7, which in turn provides a corresponding electrical signal to the computer 1 for evaluation. The computer evaluates both the amplitude of the received reflection signal, as well as the time between the sending or emitting of the respective laser pulse by the laser emitter 8 and the reception of the reflected signal by the optical receiver 7. The computer 1 may fixrther evaluate the wave form, such as the pulse width of the reflection signal pulses. These measured or evaluated signal values are then compared by the computer 1 with prescribed comparison signals or thresholds that are stored in or provided to the computer 1, whereby the computer 1 then determines the desired physical values such as the temperature increase, i.e. the elevated temperature level, from the signal amplitude, and the spatial location of the overheating condition along the fiber optic cable of the respective sensor 3, from the reflection transit time of the associated reflection pulse.

The looped sensor 5 can use the transit time of the main laser pulse from one end of the fiber optic cable to the other, instead of the transit or return time of a reflection signal arising from the end reflection of this pulse, to determine the total length of the sensor. If any one of the sensors is broken or interrupted, the portion thereof between the damage location and the end connected to the monitoring arrangement remains fully functional for its intended purposes of sensing overheating conditions. In the looped configuration of the sensor 5, the entire sensor 5 can still remain operational after it is damaged, if it is, in effect, operated as two sensors of the free-ended configuration represented by the sensors 3 and 4. Namely, after the looped sensor 5 is broken into two free-ended sensors, each of these remaining sensor portions is operated as an independent sensor through the respective interface 2 at its end connected to the laser emitter 8 and optical receiver 7.

Figure 2A:
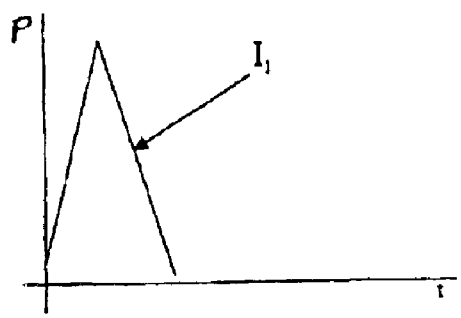
FIG. 2A is a schematic power versus time diagram representing an input light pulse that is fed into a fiber optic cable.
Figure 2B:
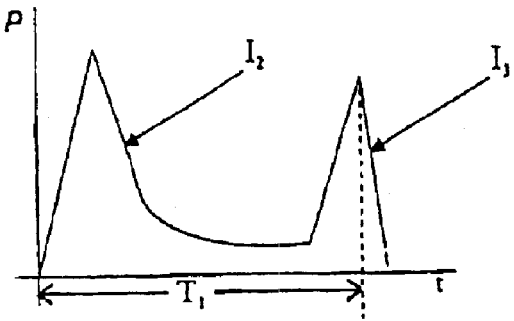
FIG. 2B is a schematic power versus time diagram representing a reflection signal arising from the reflection of the input light pulse according to FIG. 2A in the fiber optic cable.

The diagram of FIG. 2A shows the time progression of the signal strength or power of a laser light pulse, e.g. represented as a triangular pulse $I_1$, that is emitted and fed by the laser emitter into the respective fiber optic cable. Next, FIG. 2B shows the time progression of the signal strength or power of the reflection signal, associated with the input signal $I_1$, as this reflection signal is received by the optical receiver 7. An electrical signal corresponding to this optical reflection signal is then used and evaluated in the computer 1. Particularly, when the respective sensor is known to be operating without a fault or defect, and is also not experiencing an overheating condition, the reflection signal shown in FIG. 2B can be used by the computer as a baseline nominal calibration signal or comparison signal, to which later reflection signals will be compared to evaluate whether an overheating condition or a fault exists.

FIG. 2B shows that the reflection signal includes a main reflected pulse $I_2$ and an additional reflection pulse $I_3$ that results from the Fresnel reflection at the free end of the respective sensor. The time duration $T_1$ of the transit or return time of the Fresnel reflection pulse $I_3$ is a measure of the length of the corresponding fiber optic cable as described above.

Figure 3A:
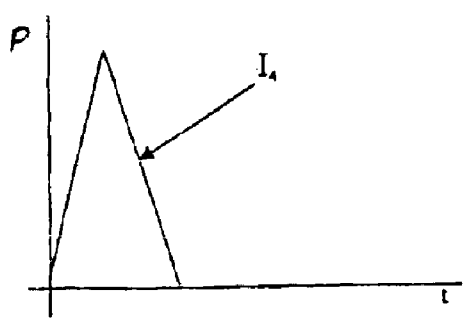
FIG. 3A is a schematic power versus time diagram representing an input light pulse that is fed into a fiber optic cable.
Figure 3B:
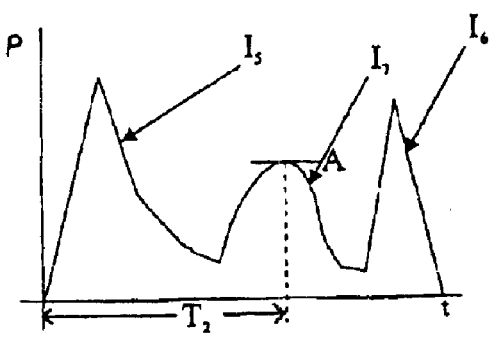
FIG. 3B is a schematic power versus time diagram representing a reflection signal arising from the reflection of an input light pulse according to FIG. 3A in the fiber optic cable, including an additional Rayleigh reflection signal caused by a local temperature increase.

FIG. 3A shows the time progression of a further input light pulse fed by the laser emitter 8 into the respective sensor. In this case (FIGS. 3A and 3B), the fiber optic cable of this sensor runs through an area exhibiting an unacceptable excessive local temperature increase. The signal time progression of the associated reflection signal is shown in FIG. 3B. The signal progression of this reflection signal distinguishes itself from the "normal condition" signal shown in FIG. 2B, in that it comprises a further reflection pulse 17 in addition to the main reflection pulse $I_5$ and the Fresnel reflection pulse $1_6$.

This further reflection pulse 17 results from an increased local Rayleigh scattering and reflection within the fiber optic cable at the location of the unacceptable high temperature. This increased local reflection is caused by the temperature-dependent refractive characteristics of the fiber optic cable, whereby the amplitude A of this reflection pulse 17 is dependent on the magnitude of the temperature, and results from and may be measured in connection with the Rayleigh effect. Thus, the signal amplitude A can be evaluated to determine the temperature existing at the given overheating location. Moreover, the spatial position of this overheating location can be determined by evaluating the signal transit or return time $T_2$ for the reception of the pulse $I_7$. This return time $T_2$ which may be evaluated similarly to the Fresnel reflection return time $T_1$ as described above, and may be used either directly or in relation to the time $T_1$, to determine the length of the cable up to the point of the overheating location, or correspondingly the spatial position of this overheating location. This information can be suitably indicated to the flight crew or maintenance personnel by a corresponding display or read-out from the computer 1.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of monitoring temperature conditions, comprising:
    inputting a light pulse into a fiber optic cable;
    receiving a reflection signal that arises from said input light pulse in said fiber optic cable; and
    determining temperature conditions on different portions of the fiber optic cable based on said reflection signal, wherein said determining comprises performing a comparison for each of said different portions of the fiber optic cable,
    wherein said comparison is performed with respect to a threshold value corresponding to one of said portions.

2. The method of claim 1, wherein said determining comprises determining said temperature conditions based on an amplitude of said reflection signal.

3. The method of claim 1, further comprising adjusting said threshold value to detect different temperature conditions in said fiber optic cable.

4. The method of claim 1, further comprising determining a location of one of said portions of the fiber optic cable based on a return time of said reflection signal.

5. The method of claim 4, further comprising determining said location by determining at least one of a location relative to an overall length of the fiber optic cable, and an absolute distance from one end of the fiber optic cable.

6. The method of claim 4, further comprising:
    correlating said location of one of the temperature conditions along said fiber optic cable with a spatial location of an area occupied by said fiber optic cable; and
    displaying on a display the spatial location of the area occupied by said fiber optic cable.

7. The method of claim 1, further comprising determining at least one of a temperature duration and a temperature progression of said temperature conditions over a predetermined time interval.

8. The method of claim 1, further comprising generating a signal to initiate at least one of an alarm, a safety measure and a corrective measure.

9. The method of claim 1, further comprising detecting and recognizing a temperature increase, said temperature increase being characteristic of a faulty escape of air from an aircraft pipe system.

10. The method of claim 9, wherein said aircraft pipe system is a pressurized air system configured to deliver hot pressurized bleed air from an aircraft engine.

11. The method of claim 1, further comprising detecting a break of said fiber optic cable with an end reflection signal, a portion of said cable between said break and said optical receiver remaining functional for monitoring a temperature condition.

12. The method of claim 1, further comprising allocating different thresholds to different portions of the fiber optic cable.

13. The method of claim 1, further comprising allocating different thresholds to different ranges of a transit time of said reflection signal.

14. A method of monitoring temperature conditions, comprising:
    inputting a light pulse into a fiber optic cable;
    receiving a reflection signal that arises from said input light pulse in said fiber optic cable; and
    determining temperature conditions on different portions of the fiber optic cable based on said reflection signal, wherein said determining comprises performing a comparison for each of said different portions of the fiber optic cable, wherein said comparison is performed with respect to a comparison signal corresponding to one of said portions.

15. The method of claim 14, further comprising adjusting said comparison signal to detect different temperature conditions in the fiber optic cable.

16. A method of monitoring temperature conditions, comprising:
   step for inputting a light pulse into a fiber optic cable;
   step for receiving a reflection signal that arises from said input light pulse in said fiber optic cable; and
   step for determining temperature conditions on different portions of the fiber optic cable based on said reflection signal, said step for determining including a step for performing a comparison for each of said different portions of the fiber optic cable,
   wherein said step for determining comprises determining said temperature conditions based on a threshold value corresponding to one of said portions.

17. The method of claim 16, wherein said step for determining comprises determining said temperature conditions based on an amplitude of said reflection signal.

18. The method of claim 16, further comprising step for adjusting said threshold value to detect different temperature conditions in said fiber optic cable.

19. The method of claim 16, further comprising step for determining a location of one of said portions of the fiber optic cable based on a return time of said reflection signal.

20. The method of claim 19, further comprising step for determining said location by determining at least one of a location relative to an overall length of the fiber optic cable, and an absolute distance from one end of the fiber optic cable.

21. The method of claim 19, further comprising:
   step for correlating said location of one of the temperature conditions along said fiber optic cable with a spatial location of an area occupied by said fiber optic cable; and
   step for displaying on a display the spatial location of the area occupied by said fiber optic cable.

22. The method of claim 16, further comprising step for determining at least one of a temperature duration and a temperature progression of said temperature conditions over a predetermined time interval.

23. The method of claim 16, further comprising step for generating a signal to initiate at least one of an alarm, a safety measure and a corrective measure.

24. A method of monitoring temperature conditions, comprising:
   step for inputting a light pulse into a fiber optic cable;
   step for receiving a reflection signal that arises from said input light pulse in said fiber optic cable; and
   step for determining temperature conditions on different portions of the fiber optic cable based on said reflection signal, said step for determining including a step for performing a comparison for each of said different portions of the fiber optic cable,
   wherein said step for determining comprises determining said temperature conditions based on a comparison signal corresponding to one of said portions.

25. The method of claim 24, further comprising step for adjusting said comparison signal to detect different temperature conditions in the fiber optic cable.

* * * * *